United States Patent
Bang et al.

(10) Patent No.: US 9,037,328 B2
(45) Date of Patent: May 19, 2015

(54) VIBRATION REDUCTION METHOD FOR AN AUTOMATIC TRANSMISSION OF A HYBRID VEHICLE AND SYSTEM FOR EXECUTING VIBRATION REDUCTION ALGORITHM

(71) Applicants: Hyundai Motor Company, Seoul (KR); Kia Motors Corporation, Seoul (KR)

(72) Inventors: Jaesung Bang, Gyeonggi-do (KR); Sangjoon Kim, Seoul (KR); Sungdeox Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 349 days.

(21) Appl. No.: 13/661,578

(22) Filed: Oct. 26, 2012

(65) Prior Publication Data

US 2013/0325285 A1 Dec. 5, 2013

(30) Foreign Application Priority Data

Jun. 5, 2012 (KR) .................. 10-2012-0060462

(51) Int. Cl.

| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60L 15/20 | (2006.01) |
| B60W 30/20 | (2006.01) |
| G05D 19/02 | (2006.01) |
| B60W 20/00 | (2006.01) |
| B60W 10/08 | (2006.01) |
| B60W 50/00 | (2006.01) |

(52) U.S. Cl.
CPC ............ *B60L 15/20* (2013.01); *B60W 20/00* (2013.01); *B60W 30/20* (2013.01); *B60W 10/08* (2013.01); *B60W 2050/0039* (2013.01); *B60W 2710/083* (2013.01); *G05D 19/02* (2013.01); *B60L 2240/12* (2013.01); *B60L 2240/421* (2013.01); *B60L 2240/423* (2013.01); *B60L 2250/26* (2013.01); *Y02T 10/7275* (2013.01); *Y02T 10/642* (2013.01)

(58) Field of Classification Search
None
See application file for complete search history.

(56) References Cited

U.S. PATENT DOCUMENTS

| | | | |
|---|---|---|---|
| 6,574,535 B1 * | 6/2003 | Morris et al. | 701/22 |
| 6,756,758 B2 | 6/2004 | Karikomi et al. | |
| 2006/0025905 A1 * | 2/2006 | Zhao et al. | 701/22 |

FOREIGN PATENT DOCUMENTS

| | | |
|---|---|---|
| JP | 2001251704 A | 9/2001 |
| JP | 2008125225 A | 5/2008 |
| JP | 2010200587 A | 9/2010 |

*Primary Examiner* — Yonel Beaulieu
*Assistant Examiner* — Lail Kleinman
(74) *Attorney, Agent, or Firm* — Mintz Levin Cohn Ferris Glovsky and Popeo, P.C.; Peter F. Corless

(57) ABSTRACT

A vibration reduction algorithm for a vehicle having no torque converter includes: optimized feedforward logic in which a request torque is divided into two or more different types of torques depending on a driving state of the vehicle. One of the two torques is provided two times with a time difference therebetween to reduce vibration of a driving system of the vehicle, and is identified as the request torque. Then the identified request torque is outputted as a motor command torque of the driving system. Furthermore, heuristic logic in which feedback information from the driving system is processed through heuristic calibration, added to the motor command torque of the optimized feedforward logic, and then provided as a motor command torque of the driving system.

5 Claims, 10 Drawing Sheets

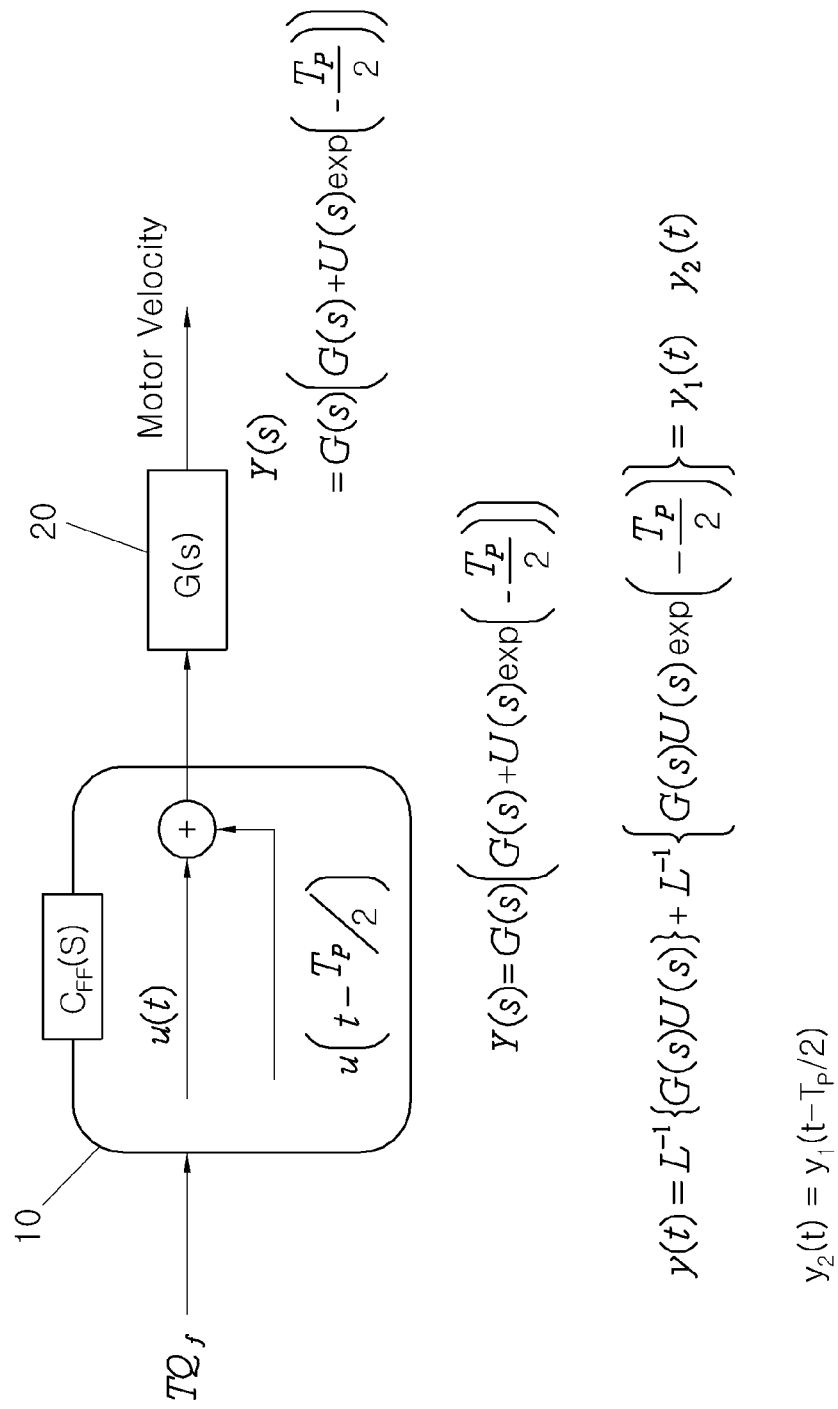

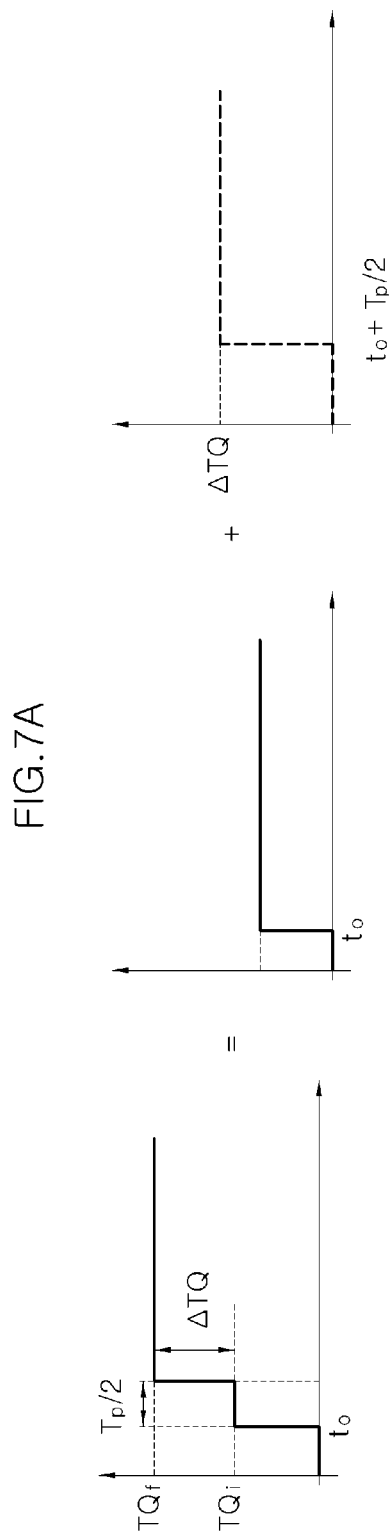

VIBRATION REDUCTION METHOD FOR AN AUTOMATIC TRANSMISSION OF A HYBRID VEHICLE AND SYSTEM FOR EXECUTING VIBRATION REDUCTION ALGORITHM

CROSS-REFERENCE(S) TO RELATED APPLICATIONS

This application claims priority to Korean Patent Application No. 10-2012-0060462, filed on Jun. 5, 2012, which is incorporated herein by reference in its entirety.

BACKGROUND OF THE INVENTION

1. Field of the Invention

Exemplary embodiments of the present invention relate to an electric vehicle or hybrid vehicle having no torque converter; and, particularly, to a vibration reduction algorithm for a vehicle having no torque converter, in which optimized feedforward logic based on a step torque or ramp torque, which is provided separately depending on an acceleration/deceleration state of the vehicle, is performed by a feedforward control function, thereby significantly reducing a time required for heuristic calibration and significantly improving launch acceleration performance.

2. Description of Related Art

In general, when an automatic transmission is implemented in an electric or hybrid vehicle, the automatic transmission does not use a torque converter like is required in a gasoline or diesel vehicle. Typically, the torque converter may serve as a damping element between an engine and a driving system (e.g., transmission and power transfer system) to reduce vibrations transmitted from the engine, in addition to converting torque from the engine to the transmission. Automatic transmissions in an electric or hybrid vehicle, however, cannot implement a damping operation using a torque converter. Therefore, in these types of vehicles, vibrations from the driving system (e.g., transmission and power transfer system), caused by a torque source of an engine or motor, are not reduced properly. Furthermore, vibrations from the driving system caused by an external vibration source are not reduced properly, either.

Accordingly, when a vibration reduction operation that takes into consideration the lack of a damping element is not implemented between the torque source (e.g., engine and motor) and the driving system (e.g., transmission and power transfer system) in an electric or hybrid vehicle, the driving and riding quality thereof are inevitably decreased. As a result, the merchantability of the vehicle also decreases.

The lack of a damping element may be overcome by executing hardware or an algorithm in therein. However, since using hardware is typically quite costly, algorithmic corrections are usually preferred by most automotive manufactures. However, when hybrid and electric vehicles are driven by motor power, the motor is not typically driven at a following motor velocity (i.e., theoretical motor velocity) where vibrations based on a motor applied torque do not occur, but instead are driven at an actual motor velocity where vibrations based on a motor applied torque do occur. Accordingly, vibration reduction measures are inevitably needed.

Examples of the vibration reduction measures may include a vibration reduction control algorithm through feedforward control logic.

The vibration reduction control algorithm may be implemented according to control logic in which a feedforward control function $C_{FF}(s)$ outputs a motor command torque, a feedback control function $C_{FB}(s)$ calculates a vibration reduction torque for suppressing speed vibration extracted as motor sensor speed (i.e., measured by a sensor installed in the motor) and motor model speed (i.e., estimated through modeling), and a driving system transfer function $G(s)$ outputs a final motor command torque obtained by summing the motor command torque and the vibration reduction torque.

That is, the motor command torque transferred to the driving system transfer function $G(s)$ may be calculated, feedback information may be used to calculate the vibration reduction torque, the motor command torque and the vibration reduction torque may be summated and converted into the final motor command torque, and the final motor command torque may be continuously adjusted according to the feedback information. Therefore, when the vibration reduction control algorithm is applied to a hybrid or electric vehicle driven by motor power, it is possible to reduce vibrations caused by the actual motor velocity which do not coincide with a following motor velocity, thereby improving the driving and riding qualities of the vehicle.

FIG. 3 as relevant prior art illustrates an example of a linear system having a feedforward control function which is performed based on the step torque and the ramp torque which are provided as a feedforward value. Referring to FIG. 3, the linear system includes a feedforward control function 10 $G_{FF}(s)$, a feedback control function 30 $C_{FB}(s)$, and a driving system transfer function 20 G(s). The feedforward control function 10 $G_{FF}(s)$ is configured to receive one torque profile between a step torque Ts and a ramp torque Tr according to an acceleration/deceleration state of the vehicle, and output a motor command torque. The feedback control function 30 $C_{FB}(s)$ is configured to provide feedback information as information for calibrating the motor command torque through heuristic calibration. The driving system transfer function 20 G(s) is configured to receive the motor command torque which is continuously calibrated. The torque outputted from the driving system transfer function 20 G(s) is converted into the actual motor velocity V.

However, since the above-described algorithm is implemented according to the feedback control logic, the algorithm inevitably has fundamental limitations because it must rely on calibration characteristics associated with the vehicle without a mathematical analysis on unique characteristics each vehicle.

Typically, the calibration characteristics of the vehicle are performed according to a heuristic algorithm. The heuristic algorithm refers to an algorithm that searches for a solution which is practically satisfactory in consideration of limited information and time constraints, without searching for the most ideal solution. Due to such characteristics, the algorithm relying on the heuristic calibration for characteristics of the vehicle is difficult to systemically design. In particular, since the heuristic calibration must be performed differently depending on vehicle types, the time consumption inevitably increases.

Therefore, since the above-described algorithm is not sufficient to effectively realize vibration reduction, the algorithm has at least one impractical limitation which should be addressed. Furthermore, due to this limitation, the launch acceleration performance of the vehicle is degraded as a result.

SUMMARY OF THE INVENTION

An exemplary embodiment of the present invention is directed to a vibration reduction algorithm and system for a vehicle having no torque converter, in which optimized feedforward logic based on a step torque or ramp torque, which is selected depending on an acceleration/deceleration state of the vehicle, is performed by a feedforward control function, thereby significantly reducing the efforts of heuristic calibration through feedback information at a feedforward step and significantly improving launch acceleration performance.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a vibration reduction algorithm for a vehicle having no torque converter includes: optimized feedforward logic executed by at least one processor installed with a computation system of the vehicle, in which a request torque is divided into two or more different types of torques depending on a driving state of the vehicle, and one of the two torques is provided two times with a time difference therebetween to reduce vibration of a driving system of the vehicle, identified as the request torque, and then outputted as a motor command torque of the driving system; and heuristic logic in which feedback information from the driving system is processed through heuristic calibration, added to the motor command torque of the optimized feedforward logic, and then provided as a motor command torque of the driving system.

The optimized feedforward logic may include: dividing, by the processor, the two different torques depending on the driving state of the vehicle and providing one torque of the two torques as the request torque serving as a feed forward input value; differentiating, by the processor, a half period from a vibration period of the driving system of the vehicle; and once the half period is differentiated, providing the one torque as a first torque, providing the one torque also as a second torque after the half period, identifying the one torque as the request torque for reducing vibration of the driving system, and then outputting the request torque as the motor command torque of the driving system.

The two torques may include a step torque applied when the vehicle is rapidly accelerated/decelerated and a ramp torque applied when the vehicle is smoothly accelerated.

In differentiating a half period from a vibration period of the driving system of the vehicle, the half period may be calculated by the processor executing the following process: a motor velocity measured by a motor velocity sensor at each sample time may be used to calculate a motor velocity increment, a time during which the motor velocity increment changes positively (+) or negatively (−) may be measured to calculate a quarter period of the period, and the quarter period may be doubled.

In identifying a half period from a vibration period of the driving system of the vehicle, the half period may be calculated by the processor executing the following process: a motor velocity based on the number of passengers and the weight of luggage in the vehicle is measured to calculate a motor velocity increment, a time in which the motor velocity increment changes positively (+) or negatively (−) is measured to calculate a quarter period of the period, and the quarter period is doubled.

In some exemplary embodiments of the present invention, the one torque is provided as a first torque, the one torque also provided as a second torque after the half period has lapsed, the one torque is identified as the request torque for reducing vibration of the driving system, and then output as a motor command torque of the driving system, when the torque is a step torque which is applied when the vehicle is rapidly accelerated/decelerated. In particular, the step torque may be applied as first and second step torques, and the application of the second step torque may be performed after the half period when the second step torque is identified as the request torque, and the above-described process may be repeated to identify the step torque as the request torque for reducing vibration.

In some exemplary embodiments of the present invention, the one torque is provided as a first torque, the one torque is also provided as a second torque after the half period has lapsed, the one torque is identified as the request torque for reducing vibration of the driving system, and then output as a motor command torque of the driving system, when the torque is a ramp torque which is applied when the vehicle is smoothly accelerated. In particular, the ramp torque may be applied as first and second ramp torques, and the application of the second ramp torque may be performed after the half period when the second ramp torque is identified as the request torque. Furthermore, the above-described process may be repeated to identify the torque as the request torque for reducing vibration, and the application of the first and second ramp torques may be calculated by applying calibration factors K and α which are acquired from an equation of request torque=K×period+αK (slope time)−period.

BRIEF DESCRIPTION OF THE DRAWINGS

FIG. 4 shows a superposition principle of a feedforward control function in the linear system in accordance with the exemplary embodiment of the present invention.

FIGS. 7A and 7B are graphs showing that vibration is reduced by the step torque provided to the feedback forward control function in accordance with the exemplary embodiment of the present invention.

DESCRIPTION OF SPECIFIC EMBODIMENTS

Figure 1:
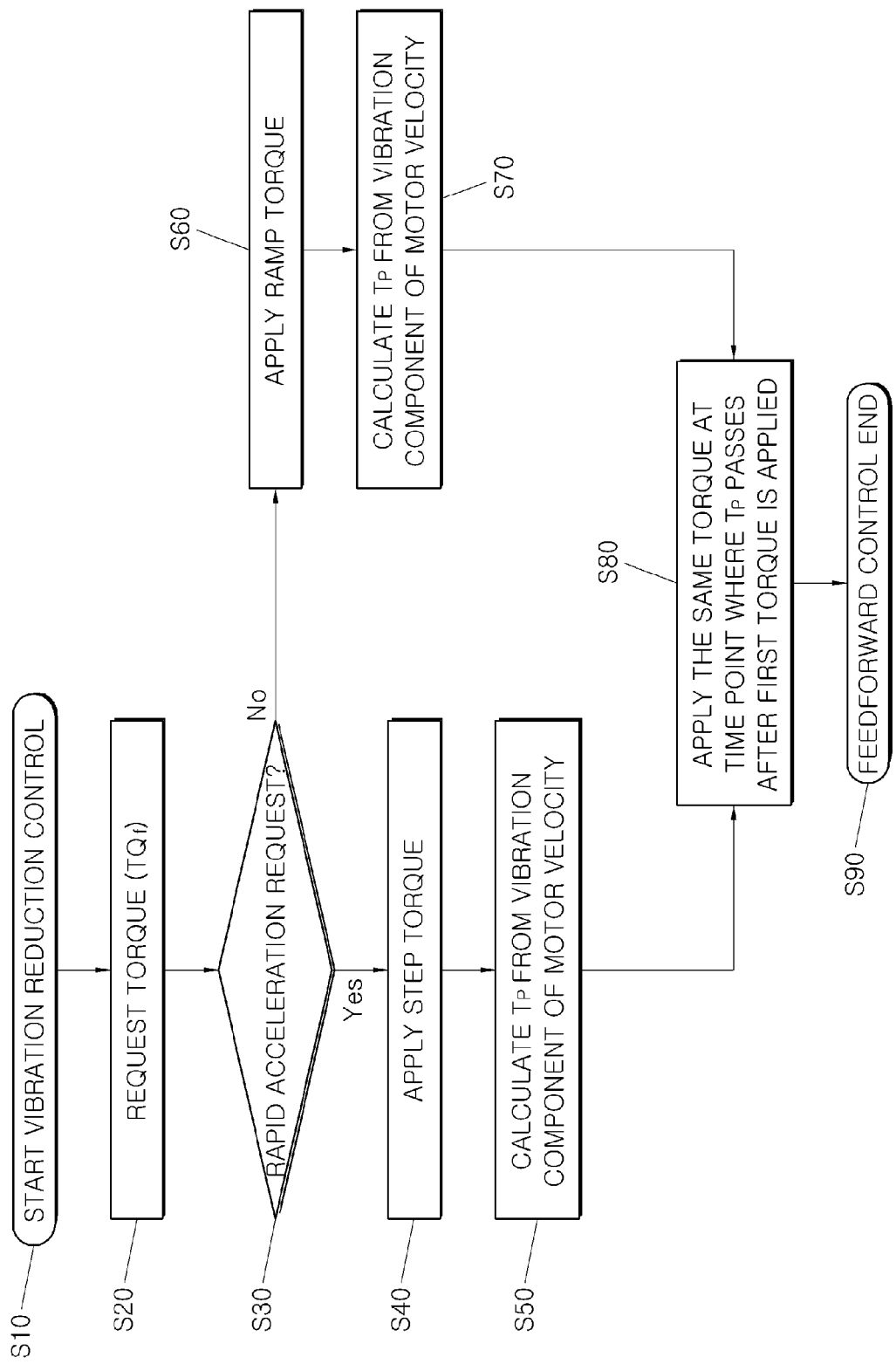
FIG. 1 is a flow chart illustrating a vibration reduction algorithm for a vehicle having no torque converter in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although the below exemplary embodiment may use a plurality of units to perform to execute the below described algorithm, it is understood that the below processes may also be performed by a single processor or computational unit specifically configured to execute the algorithm below.

Furthermore, the control logic of the present invention may be embodied as non-transitory computer readable media on a computer readable medium containing executable program instructions executed by the processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a flow chart illustrating a vibration reduction algorithm for a vehicle having no torque converter in accordance with an exemplary embodiment of the present invention.

Typically, a vehicle having no torque converter is often understood to refer to an electric vehicle or hybrid vehicle to which an automatic transmission is applied, and a vibration reduction algorithm is applied to a motor of a driving system such a vehicle.

The algorithmic steps of FIG. 1 as discussed above may be executed by a motor control unit (MCU) or processor installed within the vehicle to specifically execute the algorithm below. Step S10 is where an algorithm for reducing vibration of the driving system is initiated by the MCU. The algorithm is implemented on the assumption that the driving system is a linear system.

The algorithm executed through step S10 is an optimized feedforward logic which is specified via steps S20 to S90. The optimized feedforward logic is performed prior to heuristic calibration through feedback information. Therefore, a portion of the calibration may be significantly reduced, and launch acceleration performance may be significantly improved. Furthermore, an algorithm in which the feedback information from the driving system is provided as a motor command torque of the driving system through the heuristic calibration refers to heuristic logic. Therefore, the reduction vibration algorithm in accordance with the exemplary embodiment of the present invention includes the optimized feedforward logic and the heuristic logic.

Figure 2A:
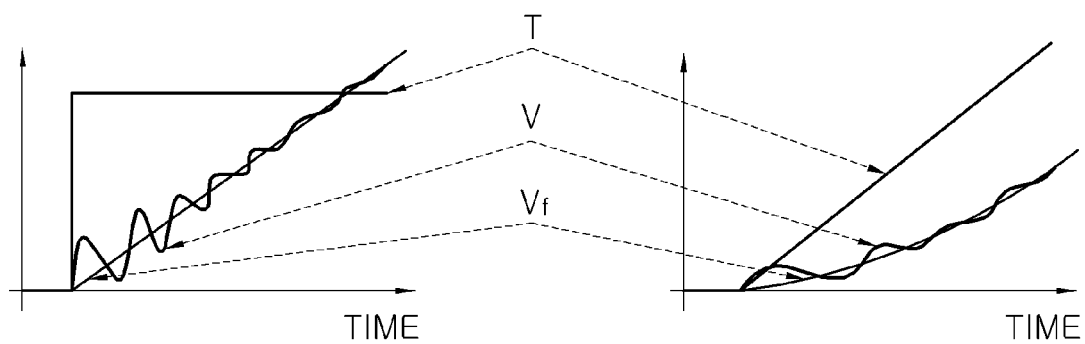
FIGS. 2A and 2B show motor vibration with respect to torque, when specific feedforward control is not performed.
Figure 2B:
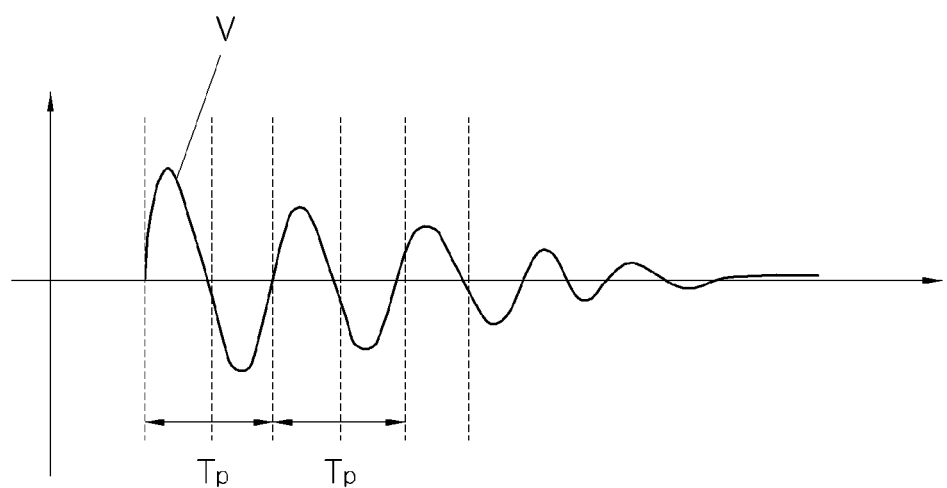
Figure 3:
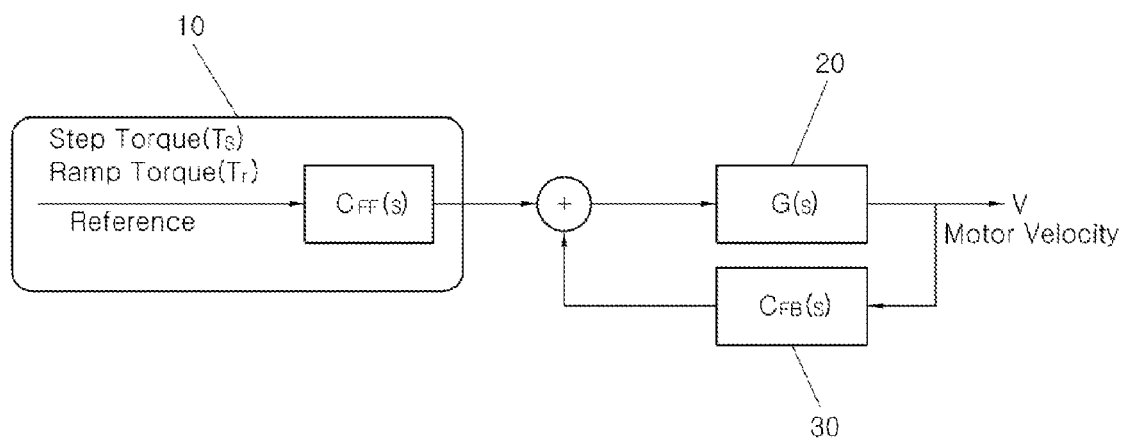
FIG. 3 illustrates an example of a linear system which is applied to a driving system to implement the vibration reduction algorithm in accordance with the exemplary embodiment of the relevant prior art.

The optimized feedforward logic may be based on a step torque and a ramp torque which are provided as a feedforward value serving as a request torque with vibration characteristics of a motor. FIGS. 2A and 2B are graphs showing vibration characteristics of a motor, which are assumed for the reduction vibration algorithm in accordance with the exemplary embodiment of the present invention. FIGS. 2A and 2B illustrate motor vibration with respect to torque, when specific feedforward control is not performed.

Referring to FIG. 2A, when a torque T is applied, a theoretical following motor velocity Vf increases without vibration over time. However, an actual motor velocity V is inevitably accompanied by vibration of which the amplitude gradually decreases over time.

FIG. 2B shows an example of the vibration of the actual motor velocity V. Referring to FIG. 2B, it can be seen that the velocity vibration is a sine wave of which the amplitude decreases within a period of T. Therefore, the optimized feedforward logic executed in the exemplary embodiment of the present invention is a method for more efficiently attenuating the sine wave having a period of $T_P$, which corresponds to the actual motor velocity V. For this method, the driving system of the vehicle is treated as a linear system.

FIG. 4 shows a superposition principle of the feedforward control function 10 $C_{FF}(s)$ in the linear system. Through this principle, it can be seen that the algorithm may be performed based on the step torque and the ramp torque which are provided as a feedforward value. Referring to FIG. 4, the feedforward control function 10 $C_{FB}(s)$ receiving a request torque $TQ_f$ as a feedforward value transfers a motor command torque to the driving system transfer function 20 G(s) according to a processing result, and the driving system transfer function 20 G(s) outputs a torque for the actual motor velocity V.

In expressions of u(t) and u(t-a) [t<a=0] as shown in FIG. 4, u(t) may include the step torque Ts or the ramp torque Tr. The driving system transfer function 20 G(s) may be Laplace-transformed and expressed as $$y(s) = G(s)\left(U(s) + U(s)\exp\left(-\frac{T_P}{2}\right)\right).$$

Here, $y_2(t)=y_1(t-T_P/2)$. Accordingly, it can be seen that y(t) is the sum of $y_1(t)$ outputted by u(t) and $y_2(t)$ outputted by $u(t-T_P/2)$, and $y_2(t)$ is obtained by shifting $y_1(t)$ by $T_P/2$.

In step S20, the request torque $TQ_f$ is inputted as a feedforward value to the feedforward control function 10 $C_{FF}(s)$. The request torque $TQ_f$ refers to a torque which is required in a current driving state of the vehicle. In step S30, the request torque $TQ_f$ inputted to the feedforward control function 10 $C_{FF}(s)$ is divided into two or more torque types. For this operation, whether the vehicle is rapidly accelerated/decelerated or not is considered.

The rapid acceleration state of the vehicle may be determined based on how far the accelerator pedal is currently displaced, and the rapid deceleration state of the vehicle may be determined based on the displacement of the brake pedal. However, the rapid acceleration/deceleration state may also be determined from a variety of information measured in the vehicle.

Figure 5A:
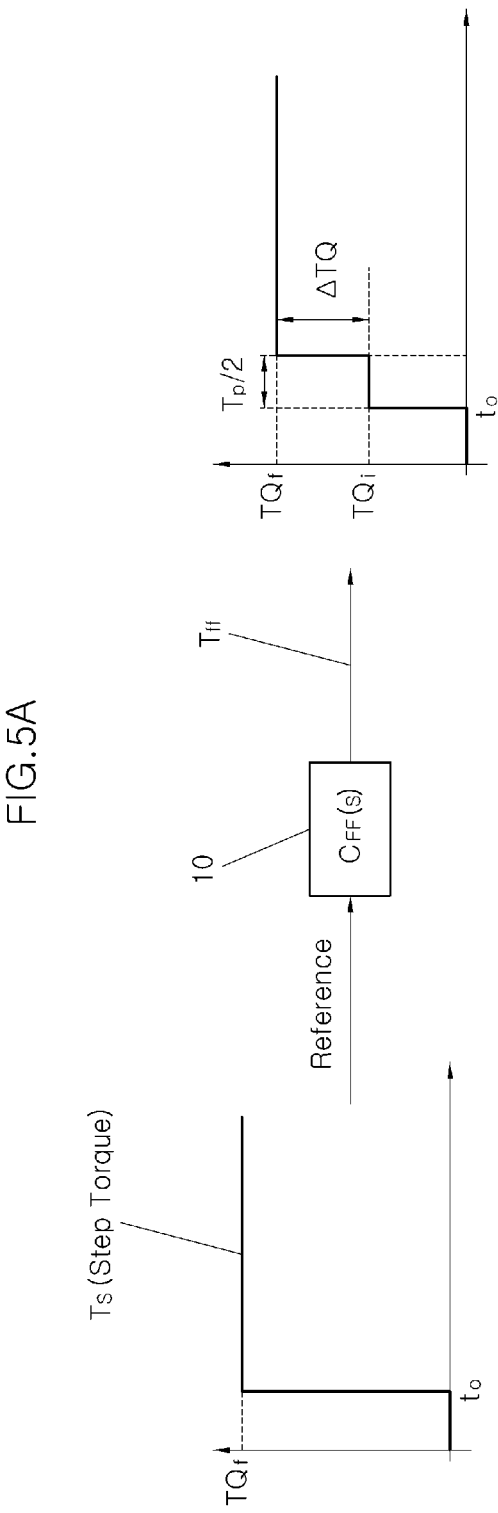
FIGS. 5A and 5B are graphs showing characteristics of a step torque provided as a request torque to the feedforward control function in accordance with the exemplary embodiment of the present invention.
Figure 5B:
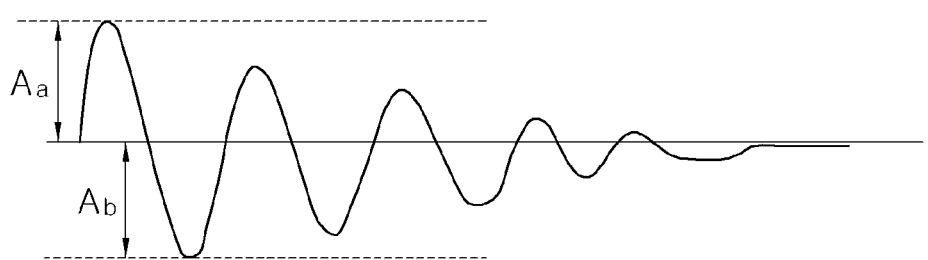

In step S40, the step torque Ts is provided as the request torque $TQ_f$ because of the rapid acceleration/deceleration. The period $T_P$ is then calculated from the vibration component of the motor velocity in step S50, when the step torque Ts is applied. FIGS. 5A and 5B show such a procedure.

FIG. 5A shows a torque profile in which the step torque Ts is inputted as the request torque $TQ_f$ to the feedforward control function 10 $C_{FF}(s)$ and outputted as a forward torque Tff through the feedforward control function 10 $C_{FF}(s)$. Referring to FIG. 5A, the period $T_P$ of the sine wave which is the unique characteristic of the driving system is divided by two, and the step torque Ts is added at about the end of the half period $T_P/2$ so that the forward torque Tff of the feedforward control function 10 $C_{FF}(s)$ coincides with an output request torque $TQ_f$.

The period $T_P$ is a unique characteristic of the driving system, and set by measuring a time at a first extreme value of vibration when the step torque Ts is applied. For example, when the motor velocity sensor measures a motor velocity, an increment Δω of the motor velocity may be calculated by measuring the motor velocity at each sample time. Then, when the increment Δω of the motor velocity is measured according to a time which changes positively (+) or negatively (−), the period $T_P$ may be defined as the positively (+)-changing time of the increment Δω or the negatively (−)-changing time of the increment Δω. The value indicates a time corresponding to ¼ of the period T. Therefore, the quarter period $T_P$¼ is calculated according to the positively (+)-changing time or the negatively (−)-changing time of the increment Δω, and the half period $T_P/2$ is automatically calculated by doubling the quarter period $T_P$¼.

Furthermore, the calculation of the half period $T_P/2$ may be calculated using the number of passengers and the weight of luggage in the vehicle. The calculation is based on the supposition that the period $T_P$ is changed by the number of passengers and the weight of luggage. From this supposition, the half period $T_P/2$ may be calculated in the same manner as the positively (+)-changing time or the negatively (−)-changing time of the increment Δω of the motor velocity. Therefore, when the step torque Ts is inputted as the request torque $TQ_f$, the half period $T_P/2$ is calculated at a time point of the quarter period $T_P$¼. Then, as the step torque Ts is added at a time point of $t_0+T_P/2$, the step torque Ts is added to finally acquire the request torque $TQ_f$.

That is, when the half period $T_P/2$ of the vibration is selected, the step torque Ts is provided as a first torque, and then provided as a second torque after the half period $T_P/2$. As this process is repeated, the request torque $TQ_f$ for reducing vibration may be finally acquired. For example, a torque $TQ_i$ is set to about end of the half period $T_P/2$ before the request torque $TQ_f$ that is acquired by calibration. The setting is performed by applying the first step torque Ts and then applying the second step torque Ts [ΔTQ(=$TQ_i$=$TQ_f/2$] after the half period $T_P/2$, under the assumption of $TQ_i$=$TQ_f/2$.

As the first step torque Ts and the second step torque Ts are applied with a time difference therebetween, the period $T_P$ may be attenuated, which is based on the assumption that an electric/hybrid vehicle has a small damping ratio. That is, as the second step torque Ts is applied in the half period $T_P/2$ after the first step torque Ts is applied, the vibration caused by the first step torque Ts is shifted by $T_P/2$.

Accordingly, when the sine wave having a period of $T_P$ as shown in FIG. 5B is divided into an upper amplitude Aa and a lower amplitude Ab, the lower amplitude Ab caused by the first step torque Ts and the upper amplitude Aa caused by the second step torque Ts are offset. During this process, the application time of the second step torque Ts is changed at around the half period $T_P/2$, and the torque $TQ_i$ is changed based on $TQ_f/2$. Accordingly, the final value of the torque $TQ_i$ may be acquired. Therefore, the step torque is applied as the first step torque Ts and the second step torque Ts, and the application of the second step torque Ts is performed after the half period $T_P/2$ in a state where the torque $TQ_i$ is determined as the request torque $TQ_f[=TQ_i=TQ_f/2]$. As this process is repeated, the request torque $TQ_f$ for vibration reduction is identified and outputted as a motor command torque of the driving system.

Figure 6:
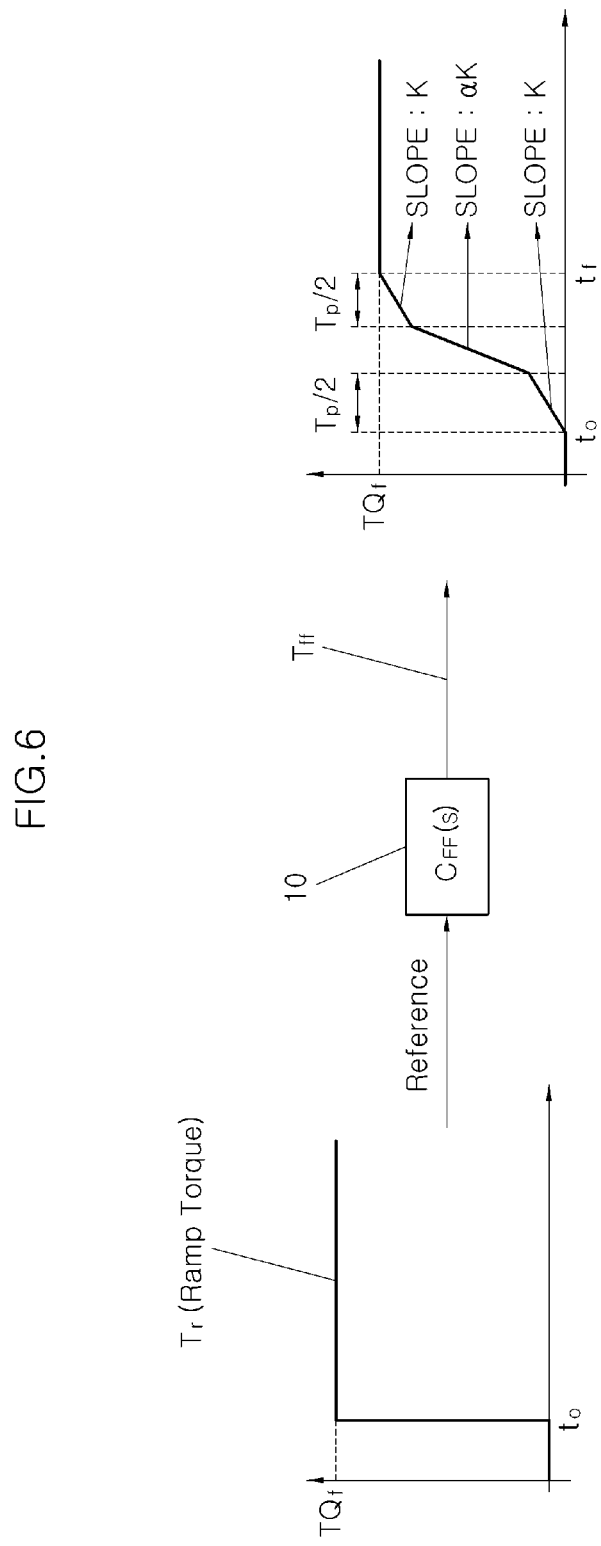
FIG. 6 is a graph showing characteristics of a ramp torque provided as a request torque to the feedforward control function in accordance with the exemplary embodiment of the present invention.

The request torque $TQ_f$ is provided as the ramp torque Tr due to smooth acceleration in step S60, and the period $T_P$ is calculated from the vibration component of the motor velocity in step S70, when the ramp torque Tr is applied. FIG. 6 shows such a procedure. In this case, the calculation of the period $T_P$ is performed in the same manner as the process which is performed in a state where the step torque Ts is applied.

When the ramp torque Tr is applied, the ramp torque Tr changes less rapidly than the step torque Ts. Therefore, initial vibration is relatively small. In the case of the ramp torque Tr, however, since the time required for applying the request torque $TQ_f$ is relatively greater than the time consumed by the step torque Ts, the initial launch response may be degraded, compared with when the step torque Ts is applied. Therefore, when the ramp torque Tr is inputted, K and α are applied as calibration factors.

The calibration factors K and a may be acquired from $TQ_f=KT_P+\alpha K(t_f-T_P)$. Here, $t_f$ represents a final time at which the request torque $TQ_f$ is applied, and is identified by considering the initial launch response. Therefore, $TQ_f$, $t_f$, and $T_P$ are given values.

From $TQ_f$, $t_f$, and $T_P$, K is first selected. At this time, K is identified by selecting α=2 as a default value in the same manner as the half period $T_P/2$ is calculated from the period $T_P$ when the step torque Ts is applied. During this process, the final value of K is identified through a process of changing a to around 2 for fine tuning. Therefore, when the request torque $TQ_f$ outputted as a motor command torque of the driving system is identified, the application of the first ramp torque Tr and the application of the second ramp torque Tr are calculated by applying the calibration factors K and α which are acquired from $TQ_f=KT_P+\alpha K(t_f-T_P)$. This aspect of the ramp torque Tr is different from the step torque Ts.

After the step torque Ts or the ramp torque Tr is first applied as the request torque $TQ_f$ to the feedforward control function 10 $C_{FF}(s)$, the same step torque Ts or ramp torque Tr is applied at a time point where the calculated half period $T_P/2$ passes in step S80.

Figure 7B:
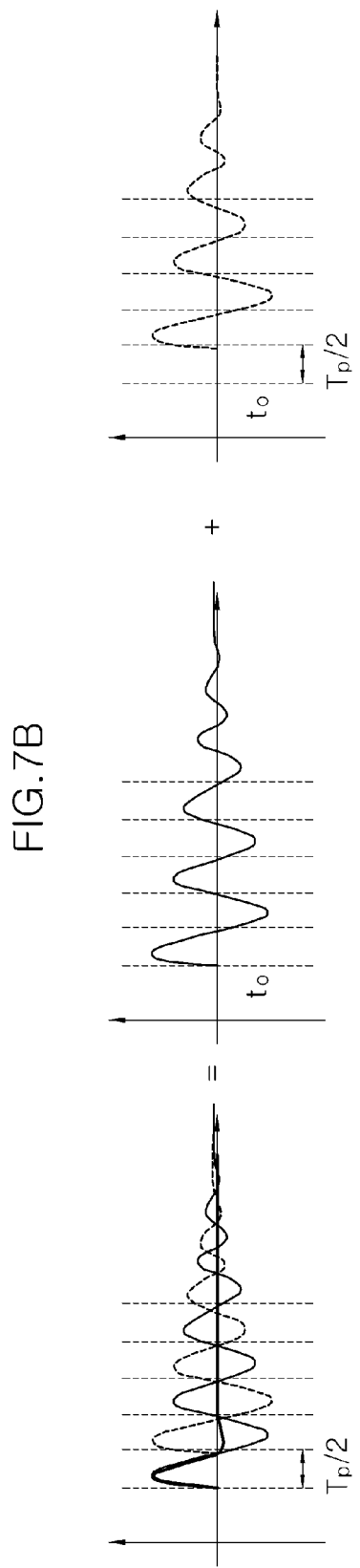

FIGS. 7A and 7B illustrate that the vibration of the sine wave having a period of Tp may be reduced by applying the same step torque Ts or ramp torque Tr at the time point where the calculated half period $T_P/2$ passes. Referring to FIGS. 7A and 7B, it can be seen that, when the step torque Ts applied as the request torque $TQ_f$ to the feedforward control function 10 $C_{FF}(s)$ is processed as shown in FIG. 7A, the vibration of the sine wave having a period of $T_P$ is reduced on the basis of $T_P/2$ as shown in FIG. 7B. As a result, it is experimentally proved that the maximum amplitude of the velocity vibration is reduced by ½ or more, and the response time is reduced by ¼.

In the illustrative embodiment of the present invention, various types of torques other than the step torque Ts and the ramp torque Tr may be provided as the request torque $TQ_f$. Even in this case, the same torque may also be provided after the half period $T_P/2$, thereby reducing vibration. Therefore, the above description that the step torque Ts or the ramp torque Tr is applied as the request torque $TQ_f$ is only exemplary.

The optimized feedforward logic performed by the feedforward control function 10 $C_{FF}(s)$, to which the step torque Ts or the ramp torque Tr is provided as the request torque $TQ_f$, is ended in step S90 and repeated as necessary. Then, the motor is driven by the feedforward control function 10 $C_{FF}(s)$, the feedback control function 30 $C_{FB}(s)$, and the driving system transfer function 20 G(s), and a vibration reduction and launch control algorithm is performed to continuously calibrate the actual motor velocity of the vehicle through the heuristic calibration by the feedback control. This means general heuristic logic for launch control of a hybrid vehicle or electric vehicle.

In accordance with the above-described vibration reduction algorithm for a vehicle having no torque converter, the request torque is divided into two or more different torques, one of the two torques is provided as a feedforward input value, the half period $T_P/2$ is identified from the period Tp of the vibration of the driving system, and the same torque is applied after the half period $T_P/2$, thereby reducing vibration. Therefore, the efforts of the heuristic calibration through feedback information may be significantly reduced by the feedforward step, and the launch acceleration performance may be significantly improved.

In accordance with the exemplary embodiment of the present invention, the motor command torque outputted from the feedforward control function $C_{FF}(s)$ is calculated based on the vibration period of the motor depending on the motor velocity, with the step torque or ramp torque selected according to the acceleration/deceleration state of the vehicle. Therefore, the efforts of the heuristic calibration through the feedback information may be significantly reduced at the feedforward step.

Furthermore, the feedforward control function $C_{FF}(s)$ receives the step torque or ramp torque depending on the acceleration/deceleration state of the vehicle, and outputs the motor command torque based on the vibration period of the motor according to the motor velocity, thereby significantly improving the launch acceleration performance of the vehicle through the final motor command torque of the driving transfer function G(s).

Furthermore, as the vibration reduction control algorithm using the heuristic calibration logic is simplified even further, it is possible to significantly increase the performance, quality and merchantability of hybrid and electric vehicles in which vibration reduction cannot be implemented between a torque source (engine or motor) and a driving system (transmission and power transfer system).

While the present invention has been described with respect to the specific embodiments, it will be apparent to those skilled in the art that various changes and modifications may be made without departing from the spirit and scope of the invention as defined in the following claims.

What is claimed is:

1. A non-transitory computer readable medium, wherein a vibration reduction algorithm for a vehicle having no torque converter is stored thereon, comprising:
   optimized feedforward logic installed on and executed by a motor control unit, in which the feed forward logic includes:
      dividing a request torque into two different types of torques depending on a driving state of the vehicle,
      providing one of the two torques two times with a time difference therebetween to reduce vibration of a driving system of the vehicle,
      providing one torque of the two torques as a request torque as a feed forward input value,
      differentiating a half period from a vibration period of the driving system of the vehicle,
      providing the one torque as a first torque, providing the one torque also as a second torque after the half period,
      identifying one torque as the request torque for reducing vibration of the driving system, and
      outputting the request torque as a motor command torque of the driving system;
   heuristic logic installed on and executed by the motor control unit, in which the heuristic logic includes:
      processing feedback information from the driving system through heuristic calibration,
      adding the motor commanded torque of the optimized feedforward logic, and
      providing a motor command torque of the driving system; and
   wherein the two torques comprise a step torque applied when the vehicle is rapidly accelerated or decelerated and a ramp torque applied when the vehicle is smoothly accelerated.

2. The vibration reduction algorithm of claim 1, wherein, in differentiating a half period from a vibration period of the driving system of the vehicle,
   the half period is calculated by the following process: a motor velocity measured by a motor velocity sensor at each sample time is used to calculate a motor velocity increment, a time during which the motor velocity increment changes positively (+) or negatively (−) is measured to calculate a quarter period of the period, and the quarter period is doubled.

3. The vibration reduction algorithm of claim 1, wherein,
   the half period is calculated by the following process: a motor velocity based on the number of passengers and the weight of luggage in the vehicle is measured to calculate a motor velocity increment, a time in which the motor velocity increment changes positively (+) or negatively (−) is measured to calculate a quarter period of the period, and the quarter period is doubled.

4. The vibration reduction algorithm of claim 1, wherein, in the providing the one torque as a first torque, providing the one torque as a second torque after the half period, deciding the one torque as the request torque for reducing vibration of the driving system, and then outputting the one torque as a motor command torque of the driving system,
   when the step torque which is applied when the vehicle is rapidly accelerated/decelerated, the step torque is applied as first and second step torques, the application of the second step torque is performed after the half period in a state where the second step torque is identified as the request torque, and the above-described process is repeated to decide the step torque as the request torque for reducing vibration.

5. The vibration reduction algorithm of claim 1, wherein, in the providing the one torque as a first torque, providing the one torque as a second torque after the half period, deciding the one torque as the request torque for reducing vibration of the driving system, and then outputting the one torque as a motor command torque of the driving system,
   when the ramp torque which is applied when the vehicle is smoothly accelerated, the ramp torque is applied as first and second ramp torques, the application of the second ramp torque is performed after the half period in a state where the second ramp torque is identified as the request torque, the above-described process is repeated to decide the torque as the request torque for reducing vibration, and the application of the first and second ramp torques is calculated by applying calibration factors K and .alpha. which are acquired from an equation of request torque=K×period+αK (slope time)−period.

* * * * *